(12) United States Patent
Tanaka et al.

(10) Patent No.: US 8,378,510 B2
(45) Date of Patent: Feb. 19, 2013

(54) STARTING AND GENERATING APPARATUS FOR ENGINE

(75) Inventors: Kenichiro Tanaka, Kobe (JP); Tatsuhiko Goi, Kobe (JP); Kazushige Sugimoto, Amagasaki (JP); Masahide Nakamura, Kakogawa (JP); Yasutaka Hirota, Kobe (JP); Koji Watanabe, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 367 days.

(21) Appl. No.: 12/453,107

(22) Filed: Apr. 29, 2009

(65) Prior Publication Data
US 2009/0286651 A1    Nov. 19, 2009

(30) Foreign Application Priority Data
May 13, 2008    (JP) .................................. 2008-126235

(51) Int. Cl.
*H02K 23/52* (2006.01)
*H02P 9/04* (2006.01)
*F02N 11/04* (2006.01)

(52) U.S. Cl. ........................... 290/31; 318/137; 477/167

(58) Field of Classification Search .................... 290/31; 318/137; 477/167; H02K 23/52; H02P 9/04; F02N 11/04
See application file for complete search history.

(56) References Cited

U.S. PATENT DOCUMENTS

| | | | | |
|---|---|---|---|---|
| 3,263,528 A * | 8/1966 | Lammerz et al. | ............... | 475/64 |
| 4,315,442 A | 2/1982 | Cordner | | |
| 4,469,970 A * | 9/1984 | Neumann | ............... | 310/156.78 |
| 4,472,651 A * | 9/1984 | Jones | ............... | 310/156.78 |
| 4,481,459 A | 11/1984 | Mehl et al. | | |
| 4,506,181 A * | 3/1985 | Jones et al. | ............... | 310/156.78 |
| 4,649,331 A * | 3/1987 | Jahns | ............... | 318/798 |
| 4,748,337 A * | 5/1988 | Raad et al. | ............... | 290/31 |
| 5,493,200 A | 2/1996 | Rozman et al. | | |
| 6,098,584 A * | 8/2000 | Ahner et al. | ............... | 123/179.3 |
| 6,581,559 B1 * | 6/2003 | Grob et al. | ............... | 123/179.3 |
| 6,838,778 B1 * | 1/2005 | Kandil et al. | ............... | 290/31 |

(Continued)

FOREIGN PATENT DOCUMENTS

| EP | 1 510 691 A2 | 3/2005 |
|---|---|---|
| FR | 2 476 231 A1 | 8/1981 |

(Continued)

OTHER PUBLICATIONS

Oct. 4, 2011 European Search Report issued in European Patent Application No. 09160057.7.

*Primary Examiner* — John K Kim (74) *Attorney, Agent, or Firm* — Oliff & Berridge, PLC (57) ABSTRACT

The invention is a starting and generating apparatus for an engine, including: a rotator configured to be used as a generator driven by an engine as well as used as a starter motor for starting the engine; a power transmission mechanism configured to connect the engine with the rotator; a starter drive unit configured to supply an electricity to the rotator to drive the rotator as the starter motor when the engine is to be started; a clutch mechanism configured to shut off a power transmission from the engine to the power transmission mechanism when the engine is to be started; and a clutch control unit configured to bring the clutch mechanism into a connected state when a rotational speed of the rotator has reached a given rotational speed at which the engine can be started.

16 Claims, 7 Drawing Sheets

U.S. PATENT DOCUMENTS

| | | | |
|---|---|---|---|
| 7,250,688 B2 * | 7/2007 | Thomson et al. | 290/34 |
| 2004/0173393 A1 * | 9/2004 | Man et al. | 180/65.2 |
| 2006/0012180 A1 * | 1/2006 | Hoppe et al. | 290/38 R |
| 2006/0100057 A1 * | 5/2006 | Severinsky et al. | 477/4 |
| 2006/0234823 A1 * | 10/2006 | Inoue | 475/216 |
| 2009/0286651 A1 * | 11/2009 | Tanaka et al. | 477/167 |

FOREIGN PATENT DOCUMENTS

| | | |
|---|---|---|
| GB | 1199145 | 7/1970 |
| JP | A-2005-98296 | 4/2005 |
| JP | A-2008-38902 | 2/2008 |
| JP | A-2008/038902 | 2/2008 |

* cited by examiner

STARTING AND GENERATING APPARATUS FOR ENGINE

CROSS REFERENCE TO RELATED APPLICATIONS

This application is based upon the prior Japanese Patent Application No. 2008-126235 filed on May 13, 2008, the entire contents of which are incorporated herein by reference.

BACKGROUND OF THE INVENTION

1. Field of the Invention

The present invention relates to a starting and generating apparatus for an engine, which is adapted for starting an engine by using a rotator, as well as for generating electricity by driving the rotator at a constant rotational speed with the output of rotation of the engine which has been brought into an independently operated state after started by the rotator.

2. Description of the Related Art

Conventionally, in a large-sized aircraft, an air-turbine type starter utilizing compressed air has been predominantly used as an engine starter. For such an air-turbine type starter, it is necessary to provide an APU (Auxiliary Power Unit), or compressed-air pipe, valves and the like, between the engine and the related equipment located outside the aircraft. As a generator configured to be driven by axial force of the engine and generate electric power after the engine is started, an IDG (Integrated Drive Generator) type is predominantly used. This IDG type generator is configured to obtain a constant frequency by rotating the generator at a given rotational speed, irrespectively of the rotational speed of the engine, by using a continuously variable speed transmission. Alternatively, a VF (Variable Frequency) type generator, which generates a variable frequency without utilizing any transmission, is also prevalent. This VF type generator is configured to supply, at a site where the control of frequency is required, the electric power to each of the related electric equipments after controlling the frequency by using inverters or the like means which are dispersedly disposed. However, in the case of using such generators, it is necessary to provide the engine starter separately from the generator. Therefore, the use of such generators tends to increase the total weight and requires a relatively wide space, leading to increase of the cost. In addition, such an air-turbine starter is likely to malfunction. Especially, the compressed-air pipes increase the weight and require a considerably wide space for installment, thus raising the cost. Besides, in the case of employing the VF-type generator, it is necessary to provide additional equipment, such as the inverters or the like.

Meanwhile, for the aircraft engine, it has been attempted to reduce the weight by using a single motor for the engine starter as well as for the generator, i.e., by using the motor as the so-called starter/generator. In this case, it is necessary to generate considerably large driving torque by using such a starter/generator when starting the engine. However, a brushless synchronous generator, which is commonly known as the generator used for the aircraft, cannot generate such large starting torque when used as the motor. Meanwhile, a permanent magnet synchronous generator can generate such large starting torque, while the voltage cannot be well controlled. Therefore, such a permanent magnet synchronous generator should require a proper power converter (or starting inverter), leading to unwanted increase of the engine size.

To address such problems, Patent Document 1 discloses the aircraft engine configured to suppress the capacity of the power converter. In this engine, a main motor is first started by supplying electricity to the permanent magnet synchronous generator attached to the main motor via the power converter in order to drive the magnet synchronous generator. The rotation of the main motor is accelerated by connecting the power converter with the main motor, and the main motor is operated as a synchronous generator after the engine is started. Alternating-current electric power is supplied to this synchronous generator without allowing the electric power to be transmitted through the power converter. Thus, the capacity of the power converter can be suppressed. Patent Document 2 teaches another aircraft engine configured for first supplying the alternating-current electric power together with direct-current electric power to an exciting stator when the engine is started, while starting the engine by supplying another alternating-current electric power to the main motor. Then, the alternating-current electric power supplied to the exciting stator is reduced as the rotational speed of the engine is increased, so as to supply only the direct-current electric power to the exciting stator at a point of time the rotational speed of the engine reaches a given value. Thereby, the main motor is operated as the generator for outputting electric voltage. Patent Document 3 describes still another aircraft engine configured for first supplying the alternating-current electric power to the exciting stator when the engine is started, while starting the engine by supplying another alternating-current electric power to the main motor via the power converter. Then, the direct-current electric power is supplied to the exciting stator after the engine is started, thereby allowing the main motor to output the electric voltage.

Furthermore, Patent Document 4 discloses the starter/generator using the IDG, which is provided with a hydraulic transmission and configured for switching the operation of the rotator from the starter motor to the generator by utilizing two one-way clutches. Patent Document 5 describes another construction, which is provided with a continuously variable speed traction transmission and configured for switching the operation of the rotator from the starter motor to the generator by utilizing the one-way clutches. Patent Document 6 teaches still another construction provided with the continuously variable speed traction transmission and configured for driving the continuously variable speed transmission to serve, apparently, as a torque amplifier when the motor is started.

Patent Document 1: U.S. Pat. No. 4,481,459
Patent Document 2: U.S. Pat. No. 5,493,200
Patent Document 3: JP 2005-98296 A
Patent Document 4: U.S. Pat. No. 4,315,442
Patent Document 5: U.K. Pat. No. 1,199,145
Patent Document 6: JP 2008-38902 A However, each of the aircraft engines respectively disclosed in the above Patent Documents 1 to 3 is configured for starting the engine with a lower output of the motor, and hence requires the power converter in order to obtain desired starting torque. Therefore, the overall size of the apparatus should be enlarged, leading to significant increase of the cost. Additionally, each of the constructions respectively described in the Patent Documents 4 and 5 uses the plurality of one-way clutches in order to switch the operation of the rotator from the starter to the generator, resulting in a rather complicated structure. Furthermore, either one of the one-way clutches undergoes slipping in its non-operated state so that the operational efficiency and reliability of the engine are affected by such slipping. In addition, the construction disclosed in the Patent Document 6 is designed to start the motor while it is connected with the engine, thus imposing a considerably great load on the motor when it is started. Accordingly, this construction should employ such a large-sized motor that can output considerably large starting torque or use a proper additional power converter.

SUMMARY OF THE INVENTION

It is an object of the present invention to provide a new starting and generating apparatus for an engine, which can smoothly start the engine, without using a power converter and/or a rotator that can output considerably large starting torque, and which can securely switch the operation of the rotator from a starter motor to a generator.

In order to achieve the above object, the starting and generating apparatus for the engine according to the present invention includes: a rotator configured to be used as a generator driven by an engine as well as used as a starter motor for starting the engine; a power transmission mechanism configured to connect the engine with the rotator; a starter drive unit configured to supply an electricity to the rotator in order to drive the rotator as the starter motor when the engine is to be started; a clutch mechanism configured to shut off a transmission of power from the engine to the power transmission mechanism when the engine is to be started; and a clutch control unit configured to bring the clutch mechanism into a connected state when a rotational speed of the rotator has reached a given rotational speed at which the engine can be started.

According to this starting and generating apparatus for the engine, since the rotator is started in a light load state, in which the transmission of power from the engine to the power transmission mechanism is shut off by the clutch mechanism, there is no need for applying so large starting torque. Therefore, the rotator can be started while being directly supplied with electricity from a power supply by the starter drive unit, without utilizing any special power converter. Such elimination of the need for using the power converter can downsize the entire apparatus. After the rotator has been started and when the rotational speed of the rotator has reached the given value that can allow the engine to be started, the clutch control unit brings the clutch mechanism into the connected state so that the output of rotation of the rotator can be transmitted to the engine via the power transmission mechanism. At this point of time, while the rotator is operated as a starter motor for the engine, the output of rotation, which is high enough for generating the torque required for starting the engine at the given rotational speed of the rotator, can be transmitted to the engine via a mechanical connecting means provided by the clutch mechanism. Thus, the engine can be smoothly started, even by the rotator adapted for generating relatively small starting torque. Moreover, this starting and generating apparatus can use such an on-off type clutch mechanism that can selectively shut off and transmit the power between the power transmission mechanism and the engine. Therefore, unlike the case of using the one-way clutches, the problem of degrading the mechanical efficiency and reliability caused by slipping generated between these two components can be securely eliminated.

In the present invention, it is preferred that the power transmission mechanism includes a continuously variable speed traction transmission having an input disk and an input shaft configured to be connected with an output shaft of the engine, the input disk being mounted on the input shaft so as to be movable relative to the input shaft in axial directions, and the clutch mechanism includes a clutch actuation unit configured to make the input disk move in the axial directions so as to switch the clutch mechanism between a connect state or a disconnect state.

In this way, the clutch mechanism can be achieved by a significantly simplified construction utilizing such an input disk that constitutes a part of the continuously variable speed traction transmission. Additionally, since the rotator is started while being disconnected from the input disk of the continuously variable speed traction transmission, i.e., while being connected with only an output disk located on an output side of the engine, the load imposed on the rotator when it is started can be further reduced, thus allowing the use of the rotator adapted for generating relatively small starting torque. Furthermore, when the rotator is operated as the generator, the continuously variable speed traction transmission can control the rotational speed of the generator to be constant, irrespectively of the rotational speed of the engine. Therefore, the electric power of a constant frequency can be outputted without using any special inverter.

In the present invention, it is preferred that the clutch mechanism is a friction-type clutch mechanism disposed between the engine and the power transmission mechanism.

In this way, the shut-off and transmission of the power from the power transmission mechanism to the engine can be securely achieved by the clutch mechanism having significantly simplified construction.

In the present invention, it is preferred that the starter drive unit includes a motor control circuit configured to actuate the rotator as a synchronous motor after starting the rotator as an induction motor.

In this way, since the rotator is first started as the induction motor by the motor control circuit, such a rotator can be started with supply of lower electric power. Meanwhile, for example, when the rotational speed of the rotator has reached the given rotational speed, the operation of the rotator can be changed into the synchronous motor by the motor control circuit. Therefore, the driving torque can be considerably increased, as such accelerating the rotation of the engine, thereby to adequately start the engine.

In the construction including the motor control circuit, it is preferred that the starter drive unit includes an exciting generator configured to be rotated while being connected with a rotary shaft of the rotator so as to actuate the rotator as the synchronous motor by allowing an electric current to flow through a rotor of the rotator.

With such provision of the exciting generator, the rotator can be first started as the induction motor by allowing the electric current to be flowed through the stator thereof, and then the operation of the rotator can be smoothly switched into the synchronous motor by allowing the electric current to be flowed from the exciting generator through the rotor of the rotator, immediately before the rotational speed of the rotator reaches the given rotational speed.

In the present invention, it is preferred that the rotator is a brushless synchronous rotator including a starting winding.

In this way, when the rotator is started as the induction motor, an induced current is flowed through the starting winding, thus increasing the starting torque, thereby smoothly starting the rotator.

In the present invention, it is preferred that the engine is an aircraft engine.

In order to achieve the above object, the method of operating a starting and generating apparatus for an engine according to the present invention includes: an electricity supplying step of supplying an electricity to a rotator by means of a starter drive unit so as to drive the rotator as a starter motor for starting an engine, the electricity supplying step being performed in a state that a power transmission mechanism configured to connect the engine with the rotator is made in a disconnect state by means of a clutch mechanism;

and a rotator connecting step of connecting the rotator with the engine via the power transmission mechanism by means of the clutch mechanism when a rotational speed of the rotator has reached a given value at which the engine can be started by the rotator.

In the present invention, it is preferred that the power transmission mechanism includes a continuously variable speed traction transmission having an input disk and an input shaft configured to be connected with an output shaft of the engine, the input disk being mounted on the input shaft so as to be movable relative to the input shaft in axial directions, and in the rotator connecting step, the input disk is moved in the axial direction by a clutch actuation unit of the clutch mechanism so as to connect the rotator with the engine via the power transmission mechanism.

In the present invention, it is preferred that the clutch mechanism is a friction-type clutch mechanism disposed between the engine and the power transmission mechanism.

In the present invention, it is preferred that the starter drive unit includes a motor control circuit configured to actuate the rotator as a synchronous motor after starting the rotator as an induction motor.

In the present invention, it is preferred that the starter drive unit includes an exciting generator configured to be rotated while being connected with a rotary shaft of the rotator so as to actuate the rotator as the synchronous motor by allowing an electric current to flow through a rotor of the rotator.

In the present invention, it is preferred that the rotator is a brushless synchronous rotator including a starting winding.

In the present invention, it is preferred that the engine is an aircraft engine.

EFFECTS OF THE INVENTION

According to the starting and generating apparatus for the engine of this invention, the rotator can be started in a considerably light load state, in which the power transmission from the power transmission mechanism to the engine is shut off by the clutch mechanism. Therefore, the rotator can be started, while being directly supplied with electricity from a proper power supply, without any help provided by the power converter. After the rotator has been started and when the rotational speed of the rotator has reached the given value that can allow the engine to be started, the clutch mechanism is brought into the connected state so that the rotation of the rotator can be transmitted to the engine via the power transmission mechanism. As a result, the rotator is operated as the starter motor for the engine. At this time, the output of rotation, which is high enough for generating the torque required for starting the engine at the given rotational speed of the rotator, can be transmitted to the engine via the mechanical connecting means provided by the clutch mechanism. Thus, the engine can be smoothly started, even by the rotator adapted for generating relatively small starting torque. Additionally, since the clutch mechanism can be such an on-off type one that can selectively shut off and transmit the power between the power transmission mechanism and the engine, the switching operation for the power transmission as described above can be securely performed, unlike the case of using the one-way clutches.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
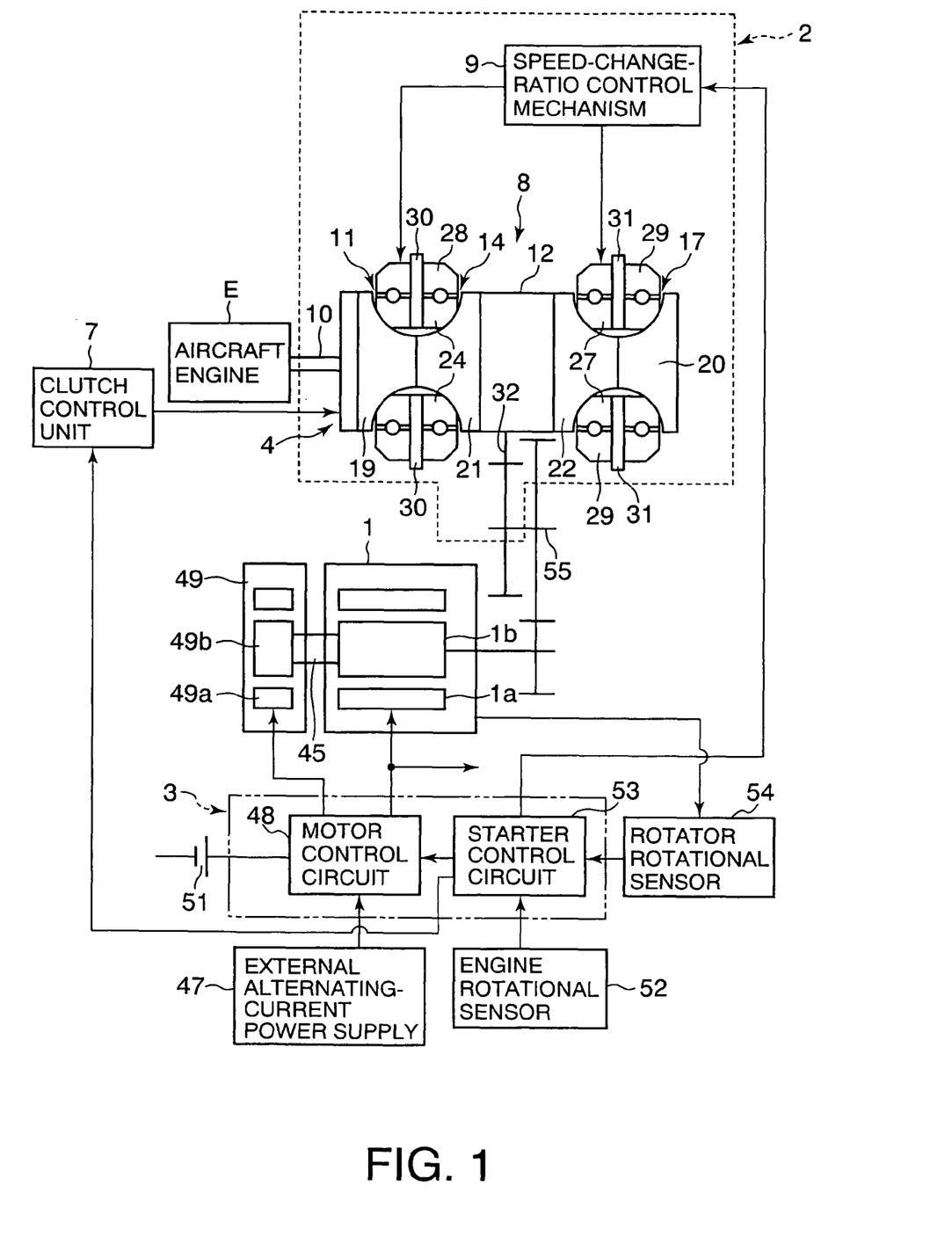
FIG. 1 is a schematic diagram showing a starting and generating apparatus for an engine according to one embodiment of the present invention.

Referring to FIG. 1, the starting and generating apparatus according to the embodiment of the present invention includes a rotator 1 which can be used as an alternating-current generator driven by an aircraft engine E as well as a starter motor for starting the engine E. This apparatus also includes a power transmission mechanism 2 configured to connect the aircraft engine E with the rotator 1. A starter drive unit 3 configured to supply electricity to the rotator 1 is disposed in order to drive the rotator 1 as the starter motor when the aircraft engine E is started. The starter drive unit 3 is also configured to switch the operation of the rotator 1 from the starter motor to the generator when the rotational speed of the engine E has reached an idling rotational speed (i.e., a speed that can allow an independent operation) after the aircraft engine E has been started. This apparatus also includes a clutch mechanism 4 configured to shut off power transmission from the aircraft engine E to the power transmission mechanism 2 when the aircraft engine E is started and a clutch control unit 7 configured to bring the clutch mechanism 4 into a connected state when the rotational speed of the rotator 1 has reached a given value that can allow the aircraft engine E to be started.

The power transmission mechanism 2 includes a speed change mechanism 8 and a speed-change-ratio control mechanism 9 configured to control a speed change ratio (or transmission gear ratio) of the speed change mechanism 8, and a transmission input shaft 10 connected with an output shaft of the aircraft engine E. The speed change mechanism 8 includes a high-speed continuously variable speed traction transmission 11 and a planetary gear transmission 12 of a two-degree-of-freedom system. The continuously variable speed traction transmission 11 comprises a double-cavity-type toroidal traction drive mechanism, in which a main part of the planetary gear transmission 12 is located between first and second cavities 14, 17 of the transmission 11.

Figure 2:
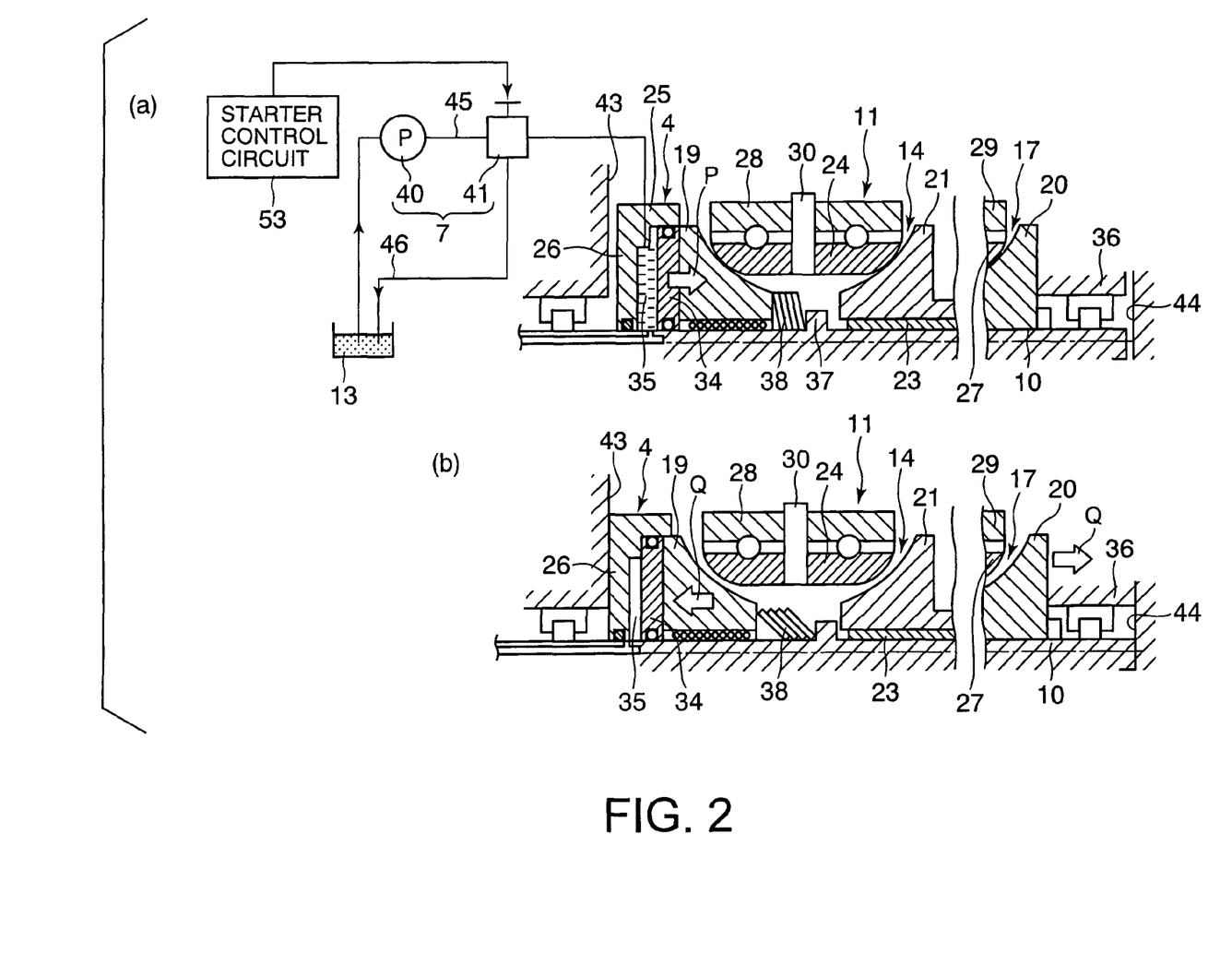
FIGS. 2(a) and 2(b) are longitudinal sections, respectively showing a connected state and a disconnected state of a clutch mechanism in the starting and generating apparatus shown in FIG. 1.

As shown in FIG. 2, the toroidal traction drive mechanism of the continuously variable speed traction transmission 11 includes the first and second cavities 14, 17 arranged with a given interval along the transmission input shaft 10. In this case, input disks 19, 20 are respectively located outside in the axial directions relative to the cavities 14, 17, while output disks 21, 22 are respectively located inside the cavities 14, 17 (see FIG. 1). A transmission output shaft 23 is fitted concentrically around the transmission input shaft 10. The input disks 19, 20 are connected with each other via the transmission input shaft 10, while the output disks 21, 22 are connected with each other via the transmission output shaft 23. The transmission output shaft 23 is connected with the planetary gear transmission 12 shown in FIG. 1. The output of the planetary gear transmission 12 can be transmitted to the rotator 1 via a carrier 32 and a transmission gear shaft 55.

Next, construction of the continuously variable speed traction transmission 11 will be described. The first and second cavities 14, 17 shown in FIG. 1 include, respectively, the input disks 19, 20, each configured to be rotated together with the transmission input shaft 10, the output disks 21, 22, each configured to be rotated together with the transmission output shaft 23, and a plurality of (for example two) power rollers 24, 27, each located between the input disks 19, 20 and the output disks 21, 22. The power rollers 24, 27 can be respectively rotated about roller shafts 30, 31 by thrust bearings (not shown) as well as by trunnions 28, 29 which are publicly known. In addition, these power rollers 24, 27 can be obliquely rotated in a plane including the roller shafts 30, 31 and transmission input shaft 10, respectively.

In the respective cavities 14, 17, three kinds of rolling elements, i.e., the input disks 19, 20, output disks 21, 22 and power rollers 24, 27, are pressed against one another with high pressure by the clutch mechanism 4, so that power can be transmitted to each rolling element due to shear resistance of a layer of high-viscosity lubricating oil generated at each connection part. Namely, the transmission of driving power between the input disk 19 and the output disk 21 can be achieved by friction via a fluid against the power roller 24 located therebetween, while the transmission of the driving power between the input disk 20 and the output disk 22 can be achieved by friction via the fluid against the power roller 27 located therebetween. Alteration of an acceleration ratio and a deceleration ratio, i.e., alteration of the speed change ratio, can be performed by controlling an angle of each power roller 24, 27 at which the power roller 24 or 27 is obliquely rotated by using the speed-change-ratio control mechanism 9. The speed change ratio may be optionally controlled within a given range of, for example, 0.5 to 2.0.

Now, the clutch mechanism 4 will be described with reference to FIG. 2. The input disks 19, 20, respectively located outside in the axial directions relative to the cavities 14, 17, are spline-fitted around the transmission input shaft 10, respectively. Thus, these input disks 19, 20 can be separated from and moved toward each other in the axial directions along the transmission input shaft 10, as shown by arrows in FIG. 2, as well as can be rotated together with the transmission input shaft 10. A housing 26 of a press 25 is located outside one of the input discs, i.e., the input disk 19. In the housing 26, a press disk 34, which is configured to apply force for hydraulically pressing the input disk 19 inward (or right in the drawing), is provided to form a pressure chamber 35 between the housing 26 and the press disk 34.

A spring 38, which is configured to retune the input disk 19 to its original position when the hydraulic pressing force is released therefrom, is provided between an inner end face (or right end face in the drawing) of the input disk 19 and a spring bearing projection 37 formed on the transmission input shaft 10. In short, the press 25 and the spring 38 constitute together the clutch mechanism 4. The clutch control unit 7 provided for controlling the operation of the clutch mechanism 4 includes a hydraulic pump 40 configured to generate hydraulic pressure by elevating pressure of oil supplied from an oil reservoir 13, and a hydraulic control valve (e.g., a servo-valve) 41 provided to an oil passage 45 extending from the hydraulic pump 40 toward the press 25 so as to control the hydraulic pressure in the hydraulic chamber 35. The hydraulic control valve 41 serves to control the hydraulic pressure by returning excessive oil to the reservoir 13 via a return passage 46.

When the clutch mechanism 4 applies the hydraulic pressure to the pressure chamber 35 by using the hydraulic pump 40, the press disk 34 will press and advance the input disk 19 in a direction designated by an arrow P depicted in FIG. 2(a). When the input disk 19 is advanced in the direction P, both of the input disks 19, 20 will be pressed against the power rollers 24, 27, respectively. Consequently, the power transmission mechanism 2 and the aircraft engine E, respectively shown in FIG. 1, will be connected with each other via the transmission input shaft 10.

In this state, when the hydraulic pressure in the hydraulic chamber 35 is lowered by means of the hydraulic control valve 41 actuated by the clutch control unit 7, the input disk 19 is retracted by restoring force applied from the spring 38, as designated by the arrow Q depicted in FIG. 2(b). As a result, the housing 26 and a backup plate 36 of the input disk 20 are returned to their original positions to be in contact with stoppers 43, 44, respectively. At this time, since the input disks 19, 20 are respectively moved away from the power rollers 24, 27, the power transmission from the aircraft engine 1 to the power transmission mechanism 2 is shut off.

Returning now to FIG. 1, the starter drive unit 3 is provided for starting the aircraft engine E from its stopped state. The starter drive unit 3 includes a motor control circuit 48 and a starter control circuit 53. The motor control circuit 48 serves to directly supply electric power from an external alternating-current power supply 47, such as the APU or other equipment located outside the aircraft, to a stator 1a of the rotator 1, as well as to supply an exciting current from an exciting power supply 51 to a stator 49a of an exciting generator 49 with a predetermined timing. The starter control circuit 53 controls the motor control circuit 48 based on an engine rotational speed inputted from an engine rotational sensor 52 configured to detect the rotation of the aircraft engine E as well as on another rotational speed inputted from a rotator rotational sensor 54 which is configured to detect the rotational speed of the rotator 1. A rotor 1b of the rotator 1 and a rotor 49b of the exciting generator 49 are connected with each other via a connecting shaft 45. Furthermore, the clutch control unit 7 also serves to actuate the hydraulic valve 41 shown in FIG. 2(a) in order to bring the clutch mechanism 4 into a connected state, after the rotational speed of the rotator 1 inputted from the rotator rotational sensor 54 has reached a given value and the operational mode of the rotator 1 has been changed into a synchronous motor mode as will be described later.

Figure 4:
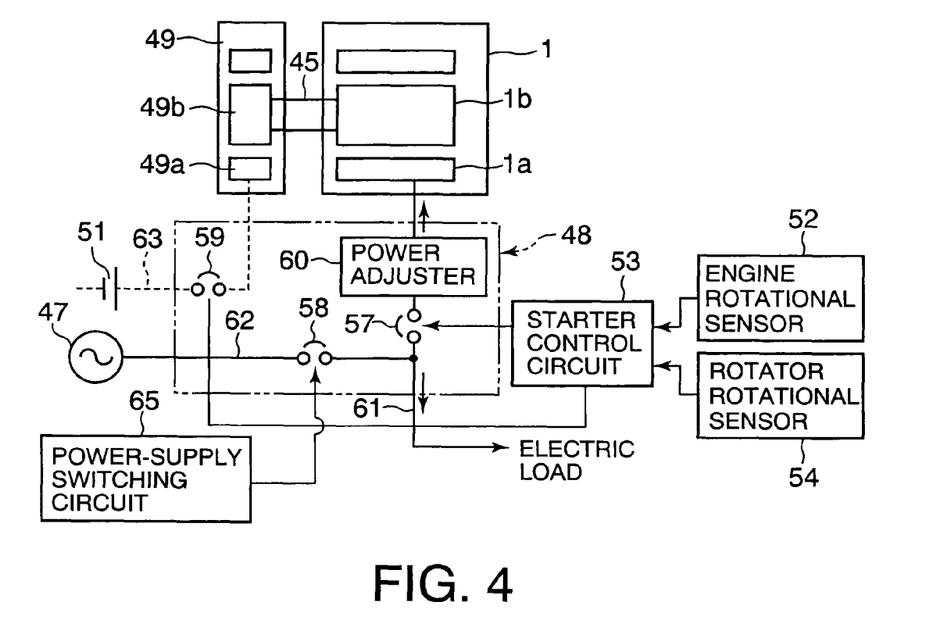
FIG. 4 is a schematic diagram showing an operational state in which the rotator in the starting and generating apparatus shown in FIG. 1 is operated as an induction motor.
Figure 5:
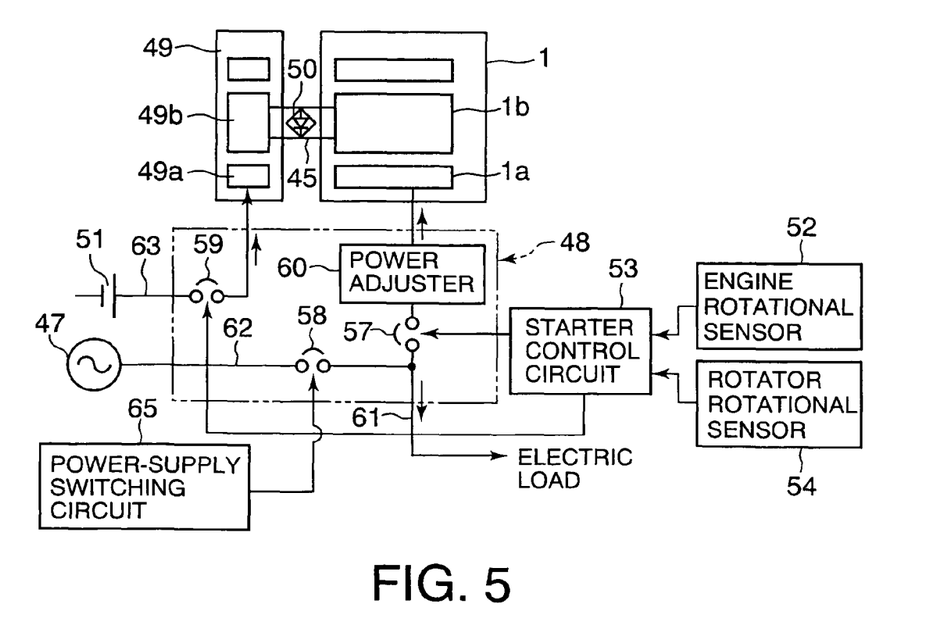
FIG. 5 is a schematic diagram showing a state in which the operation of the rotator in the starting and generating apparatus shown in FIG. 1 is switched from the induction motor to a synchronous motor.
Figure 6:
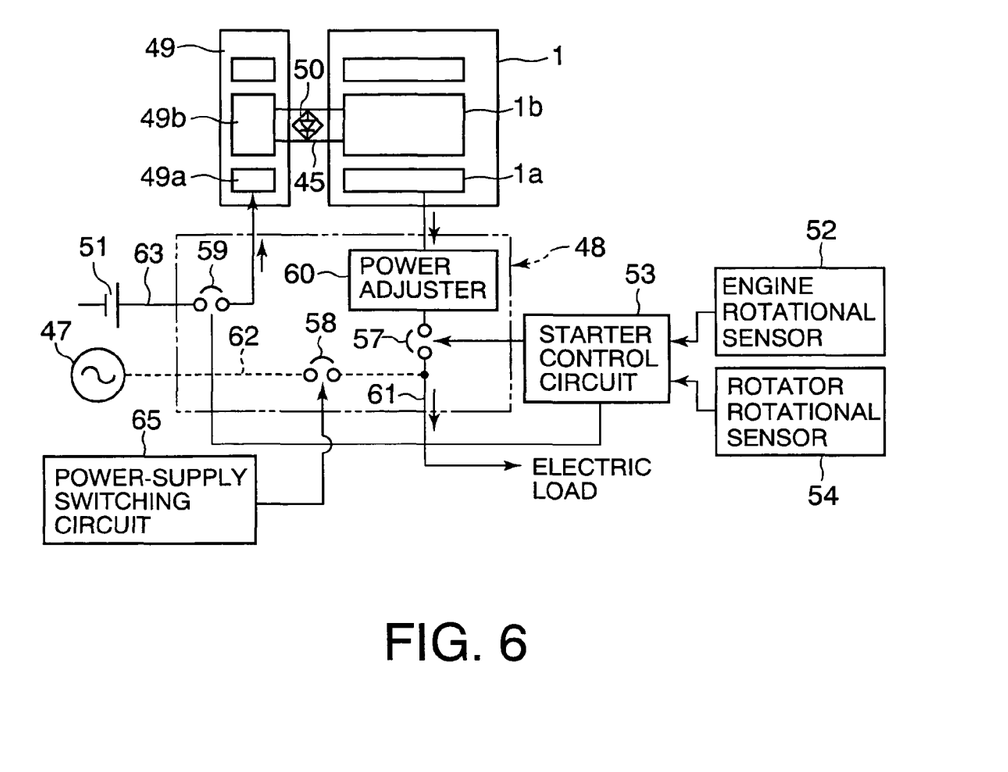
FIG. 6 is a schematic diagram showing a state in which the rotator in the starting and generating apparatus shown in FIG. 1 is operated as a generator.

FIGS. 4 to 6 show details of the motor control circuit 48, respectively. In the motor control circuit 48, a power adjuster 60 including a circuit or the like configured to suppress an inrush current flowed toward the stator 1a when the rotator 1 is started, a first electromagnetic contactor 57 provided to a first electric path 61 connecting the power adjuster 60 with an external electric load, a second electromagnetic contactor 58 provided to a second electric path 62 connecting the first electric path 61 with the external alternating-current power supply 47, and a third electromagnetic contactor 59 provided to a third electric path 63 connecting the exciting power source 51 with the stator 49a of the exciting generator 49. The first and third electromagnetic contactors 57, 59 are respectively opened and closed by a starter control circuit 53, while the second electromagnetic contactor 58 is opened and closed by a power-supply switching circuit 65.

Figure 3:
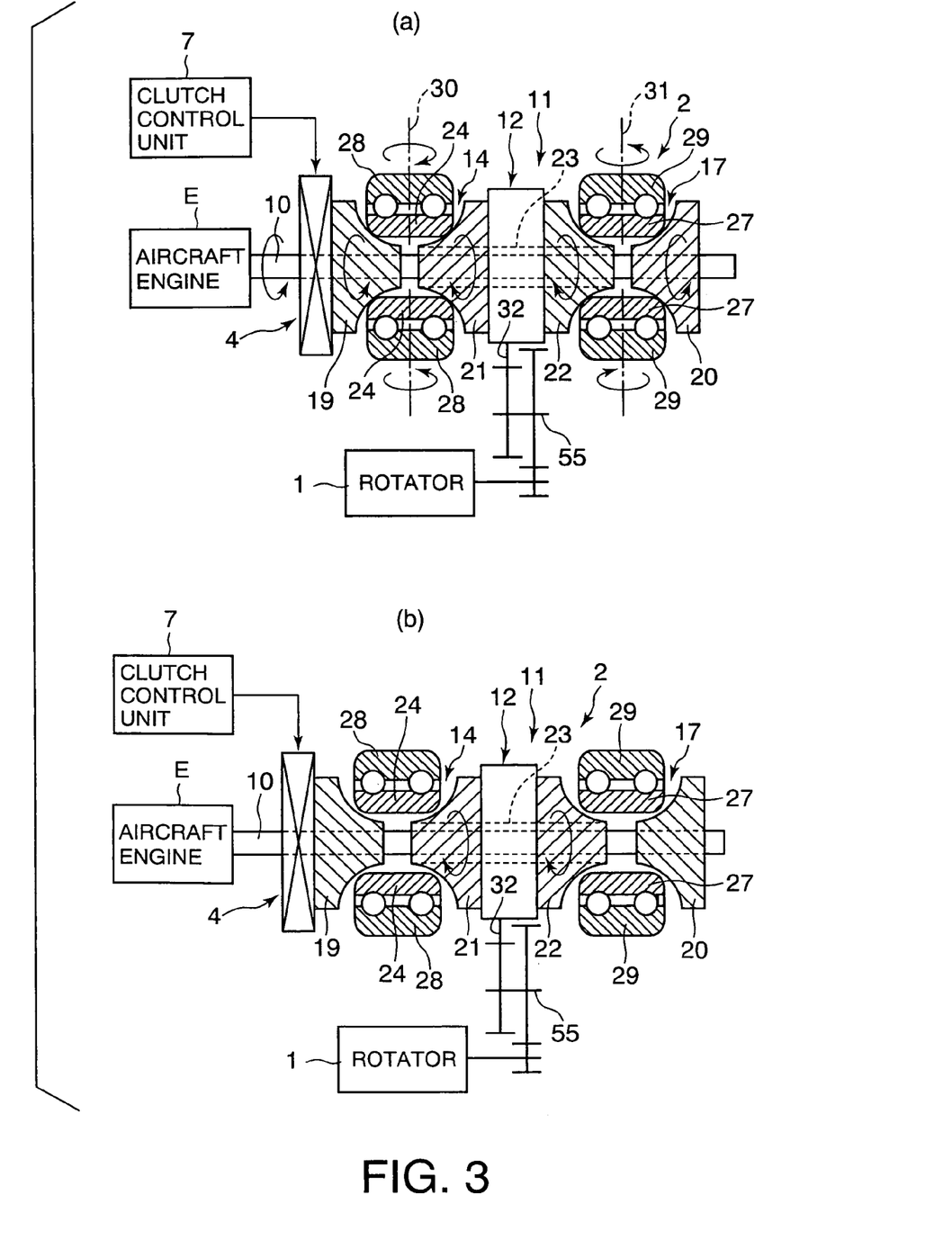
FIGS. 3(a) and 3(b) are longitudinal sections, respectively showing the connected state and disconnected state of the clutch mechanism of a continuously variable speed traction transmission in the starting and generating apparatus shown in FIG. 1.

Next, the operation of the starting and generating apparatus of this embodiment will be described. In the case of starting the aircraft engine E which is in a stopped state, the clutch control unit 7 keeps the clutch mechanism 4 in an off state in order to shut off the connection between the input disks 19, 20 and the output disks 21, 22, as shown in FIG. 3(b), respectively. In this state, as shown in FIG. 4, the first electromagnetic contactor 57 of the motor control circuit 48 is turned on by the starter control circuit 53, while the second electromagnetic contactor 58 is turned on by the power-supply switching circuit 65. As a result, alternating-current power of the external alternating-current power supply 47 will be supplied to the stator 1a of the rotator 1 via the electromagnetic contactors 57, 58. At this time, the third electromagnetic contactor 59 is kept in the off state. It is noted that the rotator 1 is a brushless synchronous rotator having the rotor 1b including starting winding (not shown). Thus, the starting winding is excited in the rotator 1 with the stator 1a supplied with the alternating-current electric power. As a result, starting torque is generated, and the rotator 1 will be started as an induction motor.

Figure 7:
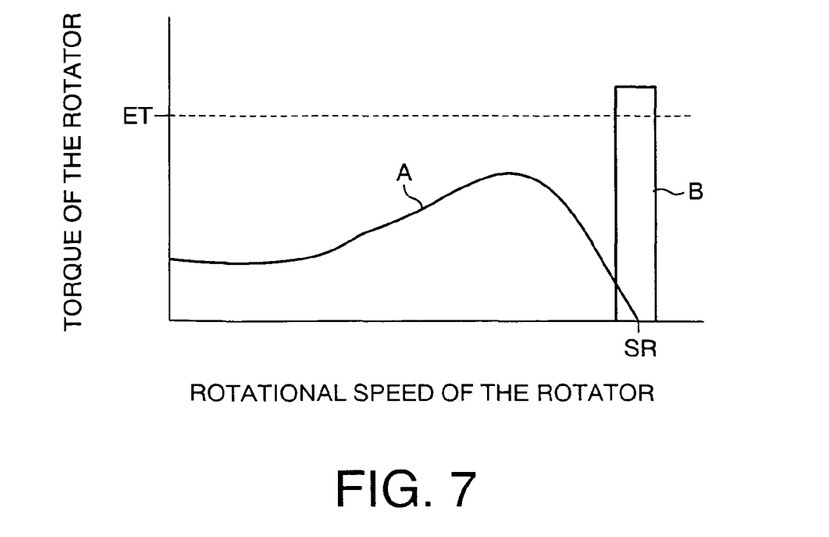
FIG. 7 is a profile showing a relationship between a rotational speed and torque when the rotator is started.

In this manner, once the rotator 1 is started to rotate, as shown in FIG. 3(b), the rotation of the rotator 1 is transmitted to the transmission output shaft 23 via the transmission gear shaft 55 and the carrier 32. Therefore, only the output disks 21, 22 respectively connected with the transmission output shaft 23 will be rotated. In this way, since the rotator 1 is started in a light load state in which the power transmission from the power transmission mechanism 2 to the aircraft engine E is shut off by the clutch mechanism 4, there is no need for providing so large starting torque. Therefore, the rotator 1 can be started by only the direct supply of electricity from the external alternating-current power supply 47 without utilizing any large-sized power converter. In addition, since the rotator 1 is started as the induction motor, it can be started with significantly lower electric power. Namely, as shown by a curved line A depicted in FIG. 7, the rotator 1 can be started with significantly smaller torque than the torque ET necessary for starting the aircraft engine E.

The starter control circuit 53 shown in FIG. 4 can serve to monitor the rotational speed inputted from the rotator rotational sensor 54, and then flow a direct exciting current to the stator 49a of the exciting motor 49 from the exciting power supply 51 by turning on the third electromagnetic contactor 59, as shown in FIG. 5, when judging that the rotational speed has well approached a synchronous rotational speed SR. In this way, alternating-current power generated in the rotor 49b of the exciting motor 49 is rectified by a rectifier circuit 50, and then direct-current power will be supplied to the rotor 1b of the rotator 1. Meanwhile, since the alternating-current power is supplied from the external alternating-current power supply 47 to the stator 1a of the rotator 1, the operational mode of the rotator 1 is changed from the induction motor to the synchronous motor. As a result, as shown by a curved line B in FIG. 7, the ability of the rotator 1 to generate driving torque will be maximized, because the rotator 1 is operated as the synchronous motor at its synchronous rotational speed SR. In other words, the rotator 1 will be in a mode of generating significantly high driving torque, when rotated at a given rotational speed (i.e., the synchronous rotational speed SR) that can allow the aircraft engine E to be started. It is noted that the torque generated by the rotator 1 depends on the external electric load.

The clutch control unit 7 shown in FIG. 1 actuates the hydraulic valve 41 in accordance with an instruction given from the starter control circuit 53, after the rotator 1 is in the synchronous motor mode. In this manner, the hydraulic pressure is applied from the hydraulic pump 40 to the hydraulic chamber 35, so that the input disks 19, 20 can be moved along the transmission input shaft 10 and pressed against the power rollers 24, 27, respectively. Thus, the aircraft engine E can be connected with the rotator 1 via the power transmission mechanism 2 and then started. When the engine E is started, the rotational speed of the rotator 1 is kept constant, while the speed change mechanism 8 is controlled by the speed-change-ratio control mechanism 9 in order to elevate the rotational speed of the aircraft engine E and bring it into an independently operated state.

Figure 8:
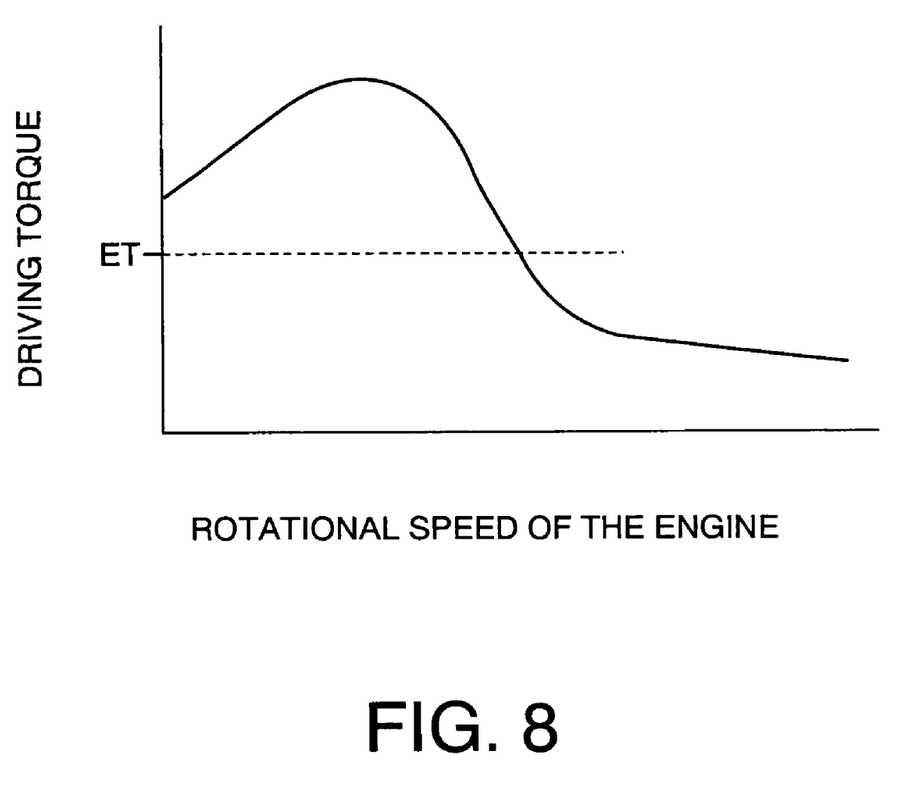
FIG. 8 is a profile showing a relationship between the rotational speed of an aircraft engine and driving torque.

Once the aircraft engine E is brought into the independently operated state, as shown in FIG. 8, the driving torque is rapidly reduced at a point of time the engine rotational speed is elevated up to a given value. When detecting that the engine rotational speed inputted from the engine rotational sensor 52 has reached the given value, the starter control circuit 53 will judge that the aircraft engine E has been in the independently operated state, then turn off the second electromagnetic contactor 58 as shown in FIG. 6, thereby to shut off the supply of the electric power from the external alternating-current power supply 47 to the rotator 1. Consequently, the operation of the rotator 1 as the starter is ended. Thereafter, the rotator 1, which is rotated by the aircraft engine E via the power transmission mechanism 2 shown in FIG. 1, will serve as the generator and supply the electric power to various electric loads, such as lighting, air conditioning and deicing devices of the aircraft, via the power adjuster 60 and first electric path 61.

After the aircraft E is brought into the independently operated state as described above, the speed-change-ratio control mechanism 9 will changeably control the speed change ratio of the continuously variable speed traction transmission 11 in response to changes of the rotational speed of the aircraft engine E, so that the rotational speed of the carrier 32 can be kept constant. Consequently, the rotation of the aircraft engine E can be transmitted to the rotator 1, while being controlled to a properly lowered and constant rotational speed. Thus, the electric power of a constant frequency can be always outputted from the rotator 1.

In the starting and generating apparatus as described above, since the rotator 1 is started in such a light load state that the power transmission from the aircraft engine E to the power transmission mechanism 2 is shut off by the clutch mechanism 4, there is no need that the rotator 1 generates so great starting torque. Therefore, the rotator 1 can be started by direct supply of the electric power from the external alternating-current power supply 47 driven via the starter drive unit 3, without utilizing the large-sized power converter. Accordingly, because there is no need for providing the power converter, the starting and generating apparatus as a whole can be securely downsized. In addition, the clutch control unit 7 can bring the clutch mechanism 4 into the connected state when the rotational speed of the rotator 1 has reached the given value that can allow the aircraft engine E to be started after the rotator 1 is started. Therefore, the output of rotation at the given rotational speed of the rotator 1 can be transmitted to the aircraft engine E via the power transmission mechanism 2, so that the rotator 1 can serve as the starter motor for the aircraft engine E at this point of time. At this time, a relatively large output of rotation due to the given rotational speed of the rotator 1 can be transmitted to the aircraft engine E via the mechanical connecting means provided by the clutch mechanism 4. Thus, the aircraft engine E can be smoothly started, even by employing the rotator 1 configured to generate relatively small starting torque. Additionally, the clutch mechanism 4 is of an on-off type that can selectively shut off and transmit the power between the power transmission mechanism 2 and the aircraft engine E. Therefore, unlike the case of using the one-way clutches, the problem of degrading the mechanical efficiency and reliability caused by slipping can be securely eliminated.

Because the clutch mechanism 4 utilizes the input disks 19, 20 that constitute together a part of the continuously variable speed traction transmission 11, the construction of such a clutch mechanism can be significantly simplified. Moreover, since the rotator 1 is started in a state in which it is disconnected from the input disks 19, 20 of the continuously variable speed traction transmission 11, i.e., in a state in which it is connected with only the output disks 21, 22, the load imposed on the rotator 1 when it is started can be further reduced, thus allowing the rotator configured to generate smaller starting torque to be used. Furthermore, when the rotator 1 is operated as the generator, the continuously variable speed traction transmission 11 can control the rotational speed of this generator to be constant, irrespectively of the rotational speed of the aircraft engine E. Therefore, the electric power of a constant frequency can be outputted without using any special inverter.

Additionally, since the rotator 1 is started as the induction motor by means of the motor control circuit 48, it can be started with relatively low electric power. Meanwhile, when the rotational speed of the rotator 1 has reached the synchronous rotational speed, the operational mode of the rotator 1 is changed into the synchronous motor mode by the motor control circuit 48. Therefore, the driving torque can be adequately increased, thereby readily starting the aircraft engine E. Moreover, the starter drive unit 3 includes the exciting motor 49 which is configured to be rotated while being connected with the rotator 1 and allow the electric current to be flowed through the rotor 1b of the rotator 1 in order to actuate the rotator 1 as the synchronous motor. Therefore, the rotator 1 is first started as the induction motor while the electric current is flowed through the starting winding of the rotor 1b thereof, then the operational mode of the rotator 1 is smoothly changed into the synchronous motor mode, when the electric current is supplied and flowed through the rotor 1b from the exciting motor 49. Besides, since the operational mode of the rotator 1 is switched from the starter motor into the generator while being operated as the synchronous motor, such a switching operation for the mode from the starter motor to the generator can be performed continuously, thereby smoothly actuating the rotator as the generator.

Figure 9:
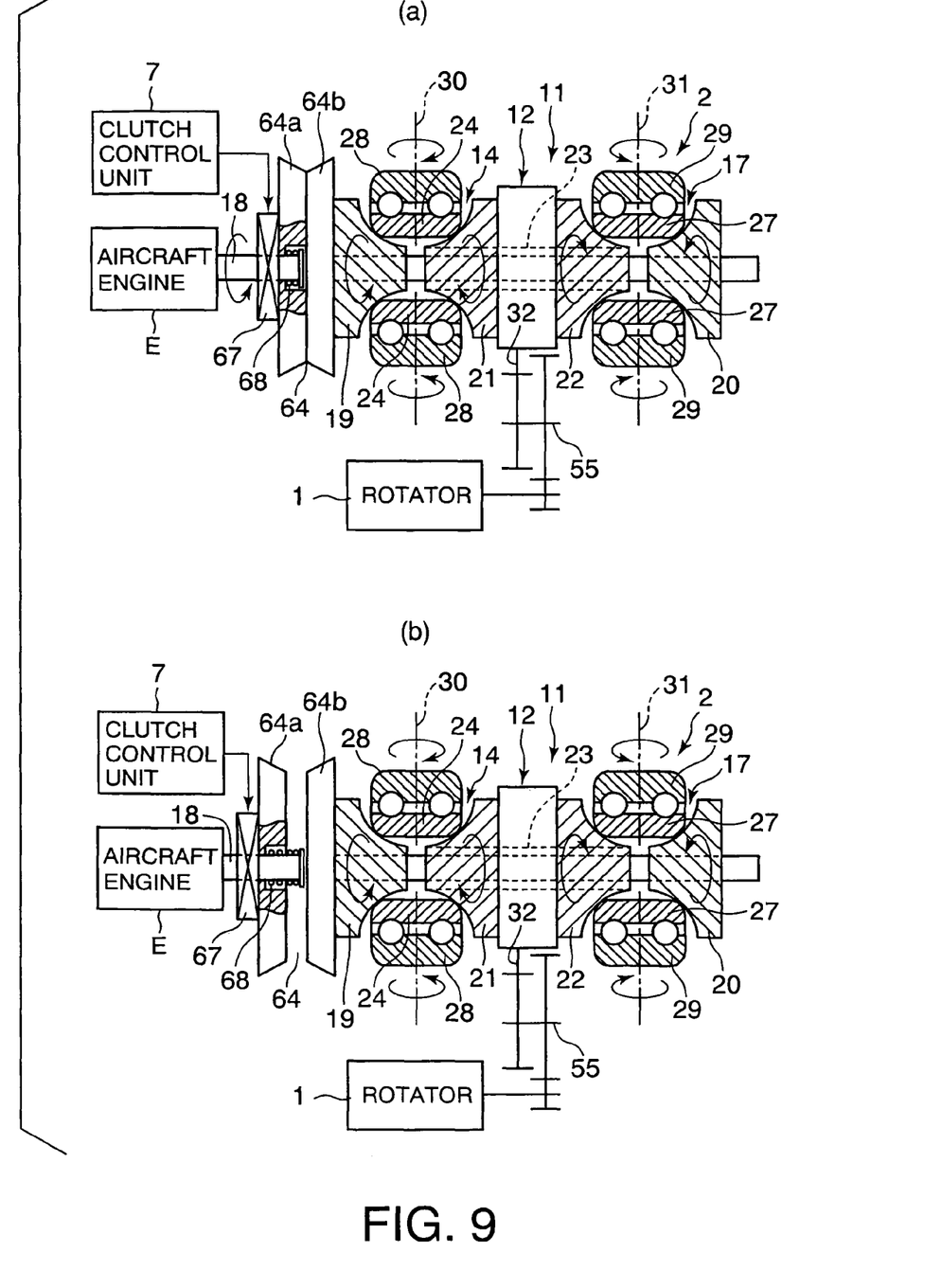
FIGS. 9(a) and 9(b) are longitudinal sections, respectively showing the connected state and disconnected state of the clutch mechanism of the continuously variable speed traction transmission in another embodiment of the present invention.

FIGS. 9(a) and 9(b) show another embodiment of the present invention. In these drawings, like or equivalent parts to those shown in FIG. 3 will be respectively designated by like numerals, and description on such parts will be omitted. Specifically, this embodiment is different from the first embodiment as previously described, only in that a friction-type clutch mechanism 64 is provided between the aircraft engine E and the power transmission mechanism 2. This clutch mechanism 64, as shown in FIG. 9(a), includes a movable friction plate 64a and a fixed friction plate 64b. In this case, when pressed by pressing force generated by a hydraulic mechanism 67, the movable friction plate 64a is advanced toward and pressed against the fixed friction plate 64b. The fixed friction plate 64b is connected with the transmission input shaft 10, while the movable friction plate 64a is connected with an output shaft 18 of the aircraft engine E. The hydraulic mechanism 67 is controlled by the clutch control unit 7 similar to the one employed in the first embodiment. A compression spring 68 is provided between the hydraulic mechanism 67 and the movable friction plate 64a. Thus, when the pressing force of the hydraulic mechanism 67 is released, the movable friction plate 64a can be retracted by the compression spring 68, thereby to bring the clutch mechanism 64 into the off state, as described in FIG. 9(b).

In this embodiment, when the rotator 1 is started, the clutch mechanism 64 is brought into the off state, in order to shut off the power transmission between the engine E and the power transmission mechanism 2. Thus, during this period of time, the rotator 1 is operated as the starter motor. In this case, while the power transmission mechanism 2 as a whole, including the input disks 19, 20 and output disks 21, 22, is rotated by means of the rotator 1, the aircraft engine E is not started. Since the driving torque of the power transmission mechanism 2 is much smaller than that of the aircraft engine E, the rotator 1 can be started with a considerably light load. Therefore, a similar effect to the first embodiment can be obtained.

Rather than using the continuously variable speed traction transmission employing the double-cavity-type toroidal traction drive mechanism as described in the above embodiments, the present invention may use the continuously variable speed traction transmission employing a single-cavity-type toroidal traction drive mechanism or half-troidal traction drive mechanism. Further, this invention may use another transmission than the traction-type transmissions as described above. It should be appreciated that various additions, alterations and eliminations can be made to the above embodiments without departing from the scope of this invention, and it should be construed that such additions, alterations and eliminations will fall within the scope of the present invention.

What is claimed is:

1. A starting and generating apparatus for an engine, comprising:
   a rotator configured to be used as a generator driven by the engine as well as used as a starter motor for starting the engine;
   a power transmission mechanism configured to connect the engine with the rotator;
   a starter drive unit configured to supply an electricity to the rotator in order to drive the rotator as the starter motor when the engine is to be started;
   a clutch mechanism configured to shut off a transmission of power from the engine to the power transmission mechanism when the engine is to be started; and
   a clutch control unit configured to bring the clutch mechanism into a connected state when a rotational speed of the rotator has reached a given rotational speed at which the engine can be started,
   wherein the power transmission mechanism includes a continuously variable speed traction transmission having an input disk and an input shaft configured to be connected with an output shaft of the engine, the input disk being mounted on the input shaft so as to be movable relative to the input shaft in axial directions,
   wherein the clutch mechanism includes a clutch actuation unit configured to make the input disk move in the axial directions so as to switch the clutch mechanism between a connect state or a disconnect state, and
   wherein the engine is an aircraft engine.

2. A starting and generating apparatus for an engine, comprising:
   a rotator configured to be used as a generator driven by the engine as well as used as a starter motor for starting the engine;
   a power transmission mechanism configured to connect the engine with the rotator;
   a starter drive unit configured to supply an electricity to the rotator in order to drive the rotator as the starter motor when the engine is to be started;

a clutch mechanism configured to shut off a transmission of power from the engine to the power transmission mechanism when the engine is to be started; and a clutch control unit configured to bring the clutch mechanism into a connected state when a rotational speed of the rotator has reached a given rotational speed at which the engine can be started, wherein the power transmission mechanism includes a continuously variable speed traction transmission having an input disk and an input shaft, wherein the clutch mechanism includes a friction-type clutch mechanism including a pair of friction plates, one of the pair of friction plates being directly connected with the input disk of the continuously variable speed traction transmission, and an other of the pair of friction plates being connected with an output shaft of the engine, and wherein the engine is an aircraft engine.

3. The starting and generating apparatus for the engine according to claim 1, wherein the starter drive unit includes a motor control circuit configured to actuate the rotator as a synchronous motor after starting the rotator as an induction motor.

4. The starting and generating apparatus for the engine according to claim 3, wherein the starter drive unit includes an exciting generator configured to be rotated while being connected with a rotary shaft of the rotator so as to actuate the rotator as the synchronous motor by allowing an electric current to flow through a rotor of the rotator.

5. The starting and generating apparatus for the engine according to claim 1, wherein the rotator is a brushless synchronous rotator.

6. A method of operating a starting and generating apparatus for an engine, comprising:

an electricity supplying step of supplying an electricity to a rotator by means of a starter drive unit so as to drive the rotator as a starter motor for starting the engine, the electricity supplying step being performed in a state that a power transmission mechanism configured to connect the engine with the rotator is made in a disconnect state by means of a clutch mechanism; and a rotator connecting step of connecting the rotator with the engine via the power transmission mechanism by means of the clutch mechanism when a rotational speed of the rotator has reached a given value at which the engine can be started by the rotator, wherein the power transmission mechanism includes a continuously variable speed traction transmission having an input disk and an input shaft configured to be connected with an output shaft of the engine, the input disk being mounted on the input shaft so as to be movable relative to the input shaft in axial directions, wherein in the rotator connecting step, the input disk is moved in the axial direction by a clutch actuation unit of the clutch mechanism so as to connect the rotator with the engine via the power transmission mechanism, and wherein the engine is an aircraft engine.

7. A method of operating a starting and generating apparatus for an engine, comprising:

an electrical supplying step of supplying an electricity to a rotator by means of a starter drive unit so as to drive the rotator as a starter motor for starting the engine, the electricity supplying step being performed in a state that a power transmission mechanism configured to connect the engine with the rotator is made in a disconnect state by means of a clutch mechanism; and a rotator connecting step of connecting the rotator with the engine via the power transmission mechanism by means of the clutch mechanism when a rotational speed of the rotator has reached a given value at which the engine can be started by the rotator, wherein the power transmission mechanism includes a continuously variable speed traction transmission having an input disk and an input shaft, wherein the clutch mechanism includes a friction-type clutch mechanism including a pair of friction plates, one of the pair of friction plates being directly connected with the input disk of the continuously variable speed traction transmission, and an other of the pair of friction plates being connected with an output shaft of the engine, and wherein the engine is an aircraft engine.

8. The method of operating the starting and generating apparatus for the engine according to claim 6, wherein the starter drive unit includes a motor control circuit configured to actuate the rotator as a synchronous motor after starting the rotator as an induction motor.

9. The method of operating the starting and generating apparatus for the engine according to claim 8, wherein the starter drive unit includes an exciting generator configured to be rotated while being connected with a rotary shaft of the rotator so as to actuate the rotator as the synchronous motor by allowing an electric current to flow through a rotor of the rotator.

10. The method of operating the starting and generating apparatus for the engine according to claim 6, wherein the rotator is a brushless synchronous rotator.

11. The starting and generating apparatus for the engine according to claim 2, wherein the starter drive unit includes a motor control circuit configured to actuate the rotator as a synchronous motor after starting the rotator as an induction motor.

12. The starting and generating apparatus for the engine according to claim 11, wherein the starter drive unit includes an exciting generator configured to be rotated while being connected with a rotary shaft of the rotator so as to actuate the rotator as the synchronous motor by allowing an electric current to flow through a rotor of the rotator.

13. The starting and generating apparatus for the engine according to claim 2, wherein the rotator is a brushless synchronous rotator.

14. The method of operating the starting and generating apparatus for the engine according to claim 7, wherein the starter drive unit includes a motor control circuit configured to actuate the rotator as a synchronous motor after starting the rotator as an induction motor.

15. The method of operating the starting and generating apparatus for the engine according to claim 14, wherein the starter drive unit includes an exciting generator configured to be rotated while being connected with a rotary shaft of the rotator so as to actuate the rotator as the synchronous motor by allowing an electric current to flow through a rotor of the rotator.

16. The method of operating the starting and generating apparatus for the engine according to claim 14, wherein the rotator is a brushless synchronous rotator.

* * * * *